United States Patent

[11] 3,628,193

[72] Inventor Carter C. Collins
    Mill Valley, Calif.
[21] Appl. No. 800,909
[22] Filed Feb. 19, 1969
[45] Patented Dec. 21, 1971
[73] Assignee The Institute of Medical Sciences
    San Francisco, Calif.

[54] TACTILE IMAGE PROJECTION SYSTEM
    11 Claims, 1 Drawing Fig.
[52] U.S. Cl. .................................................. 3/1,
    128/419 R, 178/7.8, 340/407
[51] Int. Cl. ........................................................ A61n 1/36
[50] Field of Search ......................................... 128/404,
    411, 416–419, 379, 384; 3/1; 340/407; 178/7.2,
    7.5, 7.8

[56] References Cited
UNITED STATES PATENTS
2,703,344   3/1955   Anderson ..................... 340/407 X 3,229,387   1/1966   Linvill ......................... 340/407 X
3,389,382   6/1968   Hart et al. ..................... 178/7.5 X
2,721,316   10/1955  Shaw ............................ 3/1

*Primary Examiner*—William E. Kamm
*Attorneys*—William D. Hall, Elliott I. Pollock, Fred C. Philpitt, George Vande Sande, Charles F. Steininger and Robert R. Priddy ABSTRACT: A tactile image converter for blind subjects comprises a television camera device the output of which modulates a commutating cathode-ray tube comprising a conductor array sealed in one face thereof. The camera device and commutating tube are scanned in synchronism with one another at a rate producing current pulses in the conductor array having pulse widths preferably in the order of 10 to 100 microseconds. The conductors of the array are coupled respectively to electrodes in contact with the subject's skin to produce a two-dimensional electrical skin stimulation pattern of a visible object.

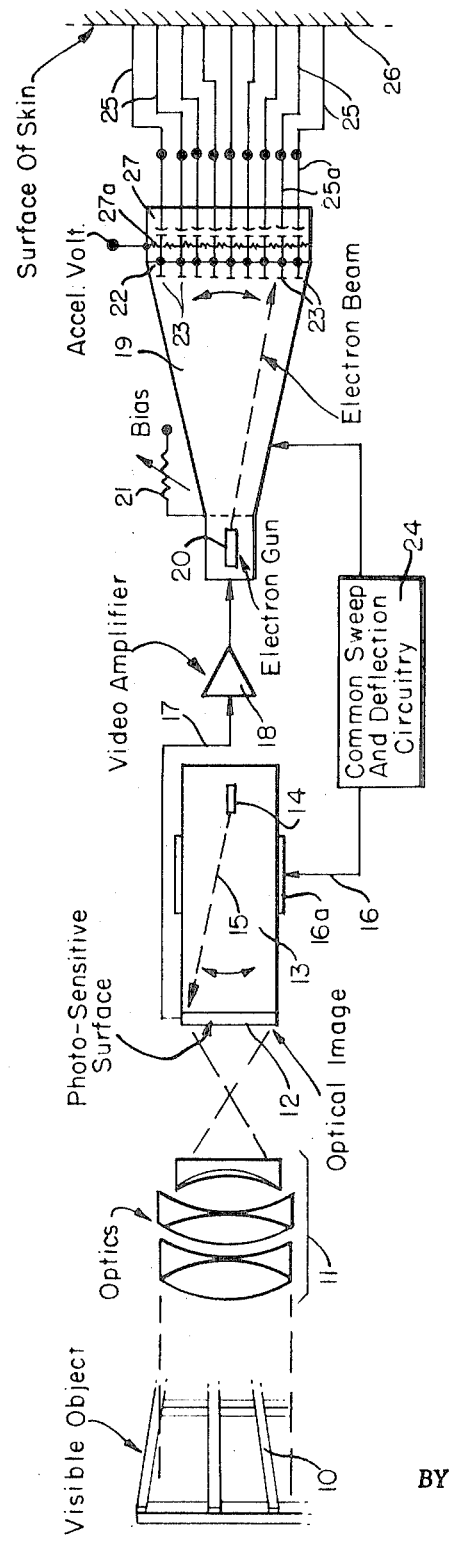

3,628,193

TACTILE IMAGE PROJECTION SYSTEM

BACKGROUND OF THE INVENTION

Blindness has always been one of the most difficult of all human afflictions to treat. Almost all therapeutic approaches to date have been designed to rehabilitate a blind person to a nonvisual world. Suggestions have been made in the past, however, that it may be possible to replace the lost sense of vision by conveying signals to the brain in some alternative fashion. In searching for an alternative modality to replace vision, it has been found that the integument of a subject is the only organ besides the eye with receptors innately organized to receive stimuli distributed and to be interpreted in two dimensions of space, with spatial differentiating and temporal integrating capability. Based on this consideration, optical images have, in the past, been converted into effective vibrating mechanical replicas. These vibrating patterns have successfully stimulated the skin at all points of the two-dimensional projected image; and tests with both blindfolded and blind subjects indicate that this patterned stimulation is recognized and interpreted by the central nervous system as pictorial information.

Various problems have arisen with systems suggested heretofore. Visual substitution systems employing arrays of mechanical vibrating tactors engaging the skin of a subject tend to be rather large, heavy and bulky; and use of such vibrating tactors accordingly limits or, in many cases, eliminates mobility of a subject using the visual substitution system. In addition to the weight disadvantage, mechanical transducer arrangements suggested heretofore tend to be expensive and generally require high power consumption. These problems have been accompanied by other problems when it has been desired to effect tactile image projection through some form of scanning arrangement. The scan circuitry which has been suggested heretofore has, for the most part, taken the form of relatively complex electronic arrangements which tend to increase the cost of the overall system, and to impose, at times, rather difficult maintenance requirements.

The present invention is intended to obviate many of these known disadvantages through the provision of a commutating-type tactile image projection system which is far simpler than other commutating systems suggested heretofore for such purposes, and which, in addition, employs electrical skin stimulation rather than mechanical vibratory skin stimulation, thereby reducing the bulk, weight, and expense of the overall system.

SUMMARY OF THE INVENTION

In accordance with the present invention, pictorial information is converted to video signal information by means of an appropriate artificial receptor such as a television camera. The artificial receptor is adapted to be scanned so as to convert the pictorial information into sequentially occurring video signals. These sequentially occurring signals are, in turn, distributed by means of a commutating cathode-ray tube the output of which feeds a plurality of electrodes in contact with the skin of a subject. By this arrangement, spatially distributed electrical stimulation, modulated in time, is achieved and impressed onto the skin of a subject so as to produce tactile information which is formed on the skin receptors, perceived at the receptor level, and then conducted to the brain via peripheral nerves so that subject can form, perceive, and conceive an image of a visible object.

The commutating cathode-ray tube (which can be called a "tacticon", includes a conductor array sealed into one face thereof. The electron beam in the commutating tube is scanned over the conductors in said array, the output of the artificial receptor being used to intensity modulate the beam of the commutating tube during said scanning. An electrical image, representing point-for-point the local brightness of the visible object in front of the artificial receptor, is thus formed on the array of conductors in the commutator tube. Current pulses from said conductors are coupled to electrodes in contact with the skin thereby to project said electrical image onto the skin of the subject as a pattern of electrical skin stimulation duplicating the optical image.

To assure that the electrical stimulation achieved is effective, but substantially pain-free, attention is given to the magnitude and width of the current pulses generated by the commutating tube. The commutating tube preferably has a relatively high continuous current capacity, e.g., 20 ma. The scanning operation in the commutator tube causes current pulses to be generated in each conductor in said tube, which pulses exhibit an initial relatively high transient (the skin capacity charging current) falling to a lower steady-state value dependent upon the resistive component of the skin impedance. In a preferred embodiment, the operating parameters are so selected that the steady-state amplitude of each current pulse is in the order of 6 ma., and the width of each such current pulse is at least 1 microsecond but preferably in the range of 10–100 microseconds.

BRIEF DESCRIPTION OF THE DRAWING

The drawing diagrammatically illustrates a preferred tactile image projection system constructed in accordance with the present invention.

DESCRIPTION OF THE PREFERRED EMBODIMENT

The arrangement of the present invention comprises a tactile television system adapted to provide images from the visible world to blind and other individuals through electrical stimulation of the skin in the form of patterned images, said images being analogs of visible objects detected by a camera and optical system. Video signals are produced by appropriate scanning of a camera tube 13, and these signals are commutated to discrete skin loci by means of a commutating electron beam tube or tacticon 19. Tactile images electrically stimulating the surface of the skin 26 are thus projected to and impressed upon the skin receptors of the subject; and the image formed on the skin receptors and perceived at the receptor level is then conducted via peripheral nerves to the subject's brain, where a concept of the visible object is formed.

In the drawing, the visible object has been designated 10; and this visible object is imaged by an appropriate lens system 11 which may include a wide-angle "fisheye" lens and appropriate zoom optics. The image produced by lens system 11 is impressed upon a photosensitive surface 12 of vidicon camera tube 13. Tube 13, as is conventional, includes an electron gun 14 producing a beam 15 which is caused to scan across the photosensitive camera surface 12 by means of appropriate deflection voltages applied at 16 to appropriate deflection means 16a; and such scanning of beam 15 produces a video signal at output 17 of the vidicon.

The video signal output from camera tube 13 is amplified by a suitable amplifier 18 and then applied to the cathode or to a grid of the electron beam commutating tube 19. Commutating tube 19 includes a gun 20 adapted to produce a fairly high beam current (e.g., 20 ma.); and the signal from vidicon 13, as amplified by amplifier 18, is used to modulate the intensity of the beam in commutating tube 19. A manually adjustable bias source 21 may also be employed to control the magnitude of the beam current in tube 19, thereby to permit the subject to adjust the intensity of electrical stimulation ultimately achieved.

The outer face 22 of commutating tube 19 contains an array of conductors 23 sealed therein. This sealed array of conductors corresponds essentially to what is known as a Charlotte plate, or conductor arrangement of similar configuration, and consists of a relatively large number of mutually insulated conductors sealed into the face of the tube and projecting from the inside to the outside of the tube surface. In practice, conductors 23 are preferably disposed in a rectangular grid array comprising a plurality of lines and rows. For the purposes of the present invention, relatively low resolution (30 to 100 lines) is all that is needed; and the design of tube 19 therefore can be relatively economical, and does not require sharp focusing and high definition. Indeed, for similar reasons, vidicon camera tube 13 can also exhibit relatively low resolution. Such low resolution devices can be manufactured with electrostatic deflection configurations, thus reducing the weight, power requirements, and cost of the focusing and deflecting systems employed.

The electron beam in commutating tube 19 is deflected in synchronism with that of vidicon tube 13 by a common sweep and deflection circuit 24. During such deflection, the beam in tube 19 impinges in succession on the inner ends of the conductors 23; and, due to the modulation of beam intensity already described, the visible object 10 is converted into an electrical pattern comprising pulses of current spatially distributed and appropriately modulated in intensity on the several conductors 23. These successive current pulses are then conveyed via cabled flexible conductors 25a to a matrix of electrodes 25 in contact with the skin 26 of a subject, for the purposes already described.

In order to provide proper electrical stimulation free of skin irritation due to long-term use, no DC polarizing current should flow in the skin electrodes 25. Therefore, the several electrodes 25, each of which is coupled respectively to one of the conductors 23 in tube 19, should preferably be coupled to said conductors 23 by either a transformer or capacitor coupling arrangement adapted to block DC current. This coupling consideration has been illustrated in the drawing as an array of capacitors 27 associated with charge-dissipating resistors or a resistive layer 27a for DC beam current return; and such coupling arrangements can be effected in any appropriate manner, including the use of discrete electrical elements, or by printed and/or integrated circuit techniques.

Tactile communication bandwidth is limited by the temporal and spatial resolving power of the skin. Tactile stimulators such as electrodes 25 can be resolved when spaced approximately 10 millimeters from one another on the skin of the back of an experienced subject. A 50 cm. square display on the back thus allows 50-line television images to be commutated by tube 19 and to be displayed by means of 2,500 electrical tactile stimulators. This is equivalent to one-quarter of the linear resolution of the human fovea, which constitutes an array of photoreceptors some 200 receptor cells in diameter. Blind subjects have learned to interpret tactile images of this type in the same sense as visual information.

In order to successfully convey images to the brain, attention should be given to the intensity time coding or display techniques employed. The absolute threshold amplitude for electrical skin stimulation varies over the body. Adequate skin stimulation can be achieved in reliably pain-free fashion, however, by appropriate selection of the magnitudes of current pulses employed, and the pulse width. It has been found that repetitive 20-microsecond pulsed electrical stimuli of more than 20 ma. reliably produce pain in most subjects, and therefore the present invention contemplates that the current capacity of commutating tube 19 should not exceed 20 ma. In practice, when a voltage pulse is impressed upon the skin, its leading edge acts to provide a charging current which is believed to permit the capacitive piercing of the external skin layer of dead epithelial cells, oil, etc; and the current then falls to a substantially lower steady-state value in the order of 2 to 6 ma. with a time constant of approximately 2 microseconds. Meaningful electrical skin stimulation has been achieved with pulses having a width in the order of 1 microsecond. Due to the time constant considerations mentioned, if the pulses have a width in the order of 2 microseconds or less, such pulses are impressed upon the skin as relatively high-intensity current spikes, e.g., 20 ma. in amplitude. While pulses of this type are acceptable, it has been found that the quality of sensation is improved by using somewhat wider pulses, preferably in the order of 10 to 100 microseconds in width, so as to permit the initial transient current to fall to its lower steady-state value and to persist at that lower value for the duration of the pulse.

The width of each pulse produced at each conductor 23, and coupled to its associated skin electrode 25, depends, of course, upon the frame or field rate, i.e., the repetition rate of scan achieved by deflection circuit 24 and, more particularly, upon the total number of electrodes 23 which are employed in tube 19. These considerations can be expressed by the relation:

$$pw = 1/Nf$$

where $pw$ is the pulse width, $N$ is the total number of electrodes 23 in tube 19, and $f$ is the frame repetition rate of scanning. These parameters should be so chosen that $pw$ is equal to or greater than 1 microsecond, and is preferably in the range of 10 to 100 microseconds.

By means of the arrangement described, a point-for-point pattern of electrical cutaneous stimulation conveys visual information to a subject. The image impressed upon the subject's skin substitutes for the lost faculty of vision, or can be used to augment vision for those involved in visual surveillance tasks where an auxiliary visual input other than the eyes is required. The electrical skin stimulation technique employed is far more economical than mechanical arrangements of transducers suggested heretofore, and is lighter in weight and generally requires smaller power consumption.

While I have thus described a preferred embodiment of the present invention, many variations will be suggested to those skilled in the art, and some of these variations have already been discussed. Other variations will be apparent. Thus, while the arrangement shown contemplates the provision of a plurality of flexible conductors 25a for interconnecting skin electrodes 25 with elements 23 in tube 19, the tube 19 can be made of such size and shape that it can be impressed directly upon the surface of the skin with each wire in the tube's array acting as an electrode in contact with the skin to project tactile images directly onto the integument. Still other variations will be apparent, and it must therefore be understood that the foregoing description is intended to be illustrative only and not limitative of my invention. All such variations and modifications as are in accordance with the principles described, are meant to fall within the scope of the appended claims.

Having thus described my invention, I claim:

1. A tactile image projection system comprising an artificial receptor for converting visual information into electrical signals, current generator means for providing current pulses having a peak amplitude no greater than 20 ma. and a width equal to or greater than 1 microsecond, means responsive to said electrical signals for modulating the amplitude of said current pulses, a matrix of spaced electrodes for engagement with the skin of a subject to achieve a patterned electrical stimulation of the skin, the peak amplitude and width producing electrical stimulation through the skin of a subject in a pain-free manner, and means for coupling said modulated current pulses to the electrodes in said matrix.

2. The system of claim 1 wherein said current generator means includes means operative to produce said current pulses with a pulse width in the range of 10–100 microseconds.

3. The system of claim 1 wherein said current generator means comprises a cathode-ray tube having an array of mutually insulated conductors sealed in one face thereof, means in said tube for providing an electron beam, and scanning means adjacent said tube for scanning said electron beam over said conductors to produce said current pulses in said conductors.

4. The system of claim 3 wherein said artificial receptor comprises a television camera tube having a photosensitive surface, means in said camera tube for generating an electron beam, and scanning means adjacent said camera tube for scanning the electron beam in said camera tube over said surface.

5. The system of claim 4 including deflection control means coupled to the scanning means for said cathode-ray tube and to the scanning means for said camera tube for causing the electron beam in said camera tube to scan said photosensitive surface in synchronism with the scanning of the electron beam in said cathode ray tube over said array.

6. The system of claim 5 including a single video amplifier coupling video signal outputs from said television camera tube to the electron beam producing means in said cathode-ray tube to effect said amplitude modulation of said current pulses.

7. The system of claim 3 wherein said coupling means couples different ones of the electrodes in said matrix to corresponding different ones of the conductors in said array.

8. The system of claim 7 wherein said coupling means includes means for blocking the flow of direct current from said conductors to said electrodes.

9. The system of claim 8 wherein said blocking means comprises capacitive coupling means.

10. The system of claim 3 wherein there are a total of $N$ conductors in said array, said scanning means being operative to regularly sweep all of said $N$ conductors at a repetition rate of $f$ times per second, whereby said conductors are energized in succession to produce current pulses each of which has a width $1/NF$, where $1/NF$ is equal to or greater than $1 \times 10^{-6}$ seconds.

11. The system of claim 1 wherein said artificial receptor comprises a television camera having a photosensitive surface and means in said camera for generating said electrical signals.

* * * * *